United States Patent

[11] 3,602,404

| [72] | Inventor | Robert V. Frank |
| | | Weld County, Southeast of Kersey, Colo. 80644 |
| [21] | Appl. No. | 844,745 |
| [22] | Filed | July 23, 1969 |
| [45] | Patented | Aug. 31, 1971 |

[54] MANURE SPREADER
6 Claims, 6 Drawing Figs.

[52] U.S. Cl. .................................................. 222/252,
214/509, 222/371, 239/657, 239/671
[51] Int. Cl. ...................................................... A01c 15/18
[50] Field of Search ......................................... 222/252,
371, 415; 214/83.26, 508, 509; 239/657, 671, 682

[56] References Cited
UNITED STATES PATENTS

| 2,885,209 | 5/1959 | Bruecker | 239/657 |
| 648,152 | 4/1900 | Loessner | 239/671 |
| 1,571,364 | 2/1926 | Bates | 239/671 X |
| 1,729,369 | 9/1929 | Tucker | 239/671 |

Primary Examiner—M. Henson Wood, Jr.
Assistant Examiner—Michael Y. Mar
Attorney—Wilbur A. E. Mitchell ABSTRACT: A feed yard chunk manure spreader attachment for the tail gate end of a large pivoted truck body, comprising a vertically operable chunk breaker at that end and having spaced breaker members for breaking the chunks and permitting passing of the broken particles through the breaker.

INVENTOR.
Robert V. Frank
BY
ATTORNEY

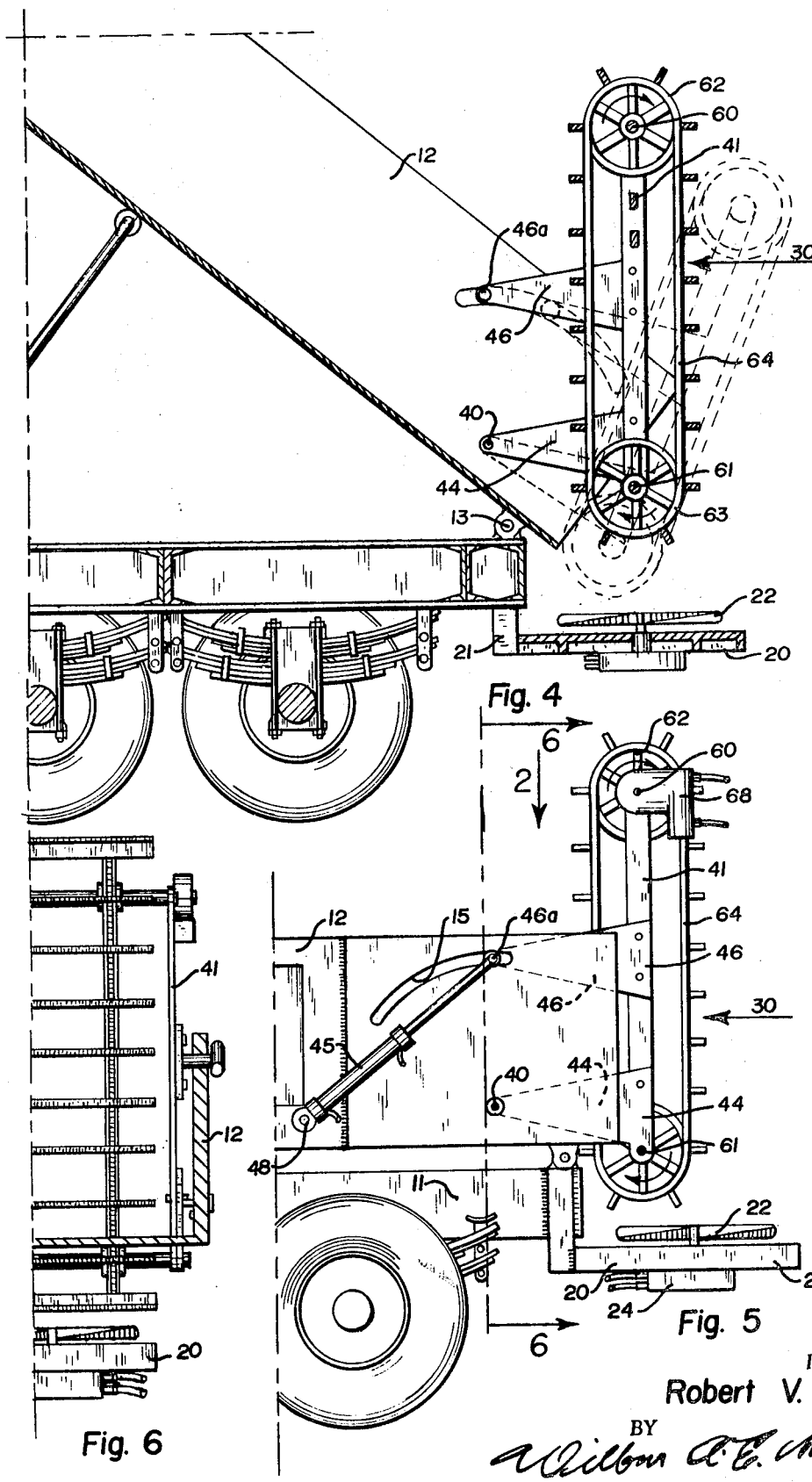

MANURE SPREADER

My invention is an improvement in mechanical manure spreaders.

Heretofore, as far as known, spreaders have been of the type for dispersion of fibrous and straw filled manure fertilizer. Today there are great quantities of nonfibrous fertilizer available at cattle feed lots, which is usually loaded onto enormous dump trucks and taken to the field where it is desired to later spread that fertilizer. Those heavy dump trucks dump that fertilizer in piles along the edge of the field. Then the farmer comes along with a tractor-scoop and scoop-lifts the fertilizer from those piles into conventional manure spreaders.

The heretofore conventional spreaders are of the type having a stationary truck bed with a movable horizontal floor conveyor as the means for directing the contents out the rear. As a result, to get the fertilizer out of the feed lot and spread onto the field, unnecessary time and expense occurs because of the two distinct steps just explained.

I have found that it is possible to provide an attachment at the rear of the large dump trucks, wherein the fertilizer is loaded originally at the feed lot, and then with that same truck by my attachment to spreadingly apply that fertilizer across the intended field, without having to unload the contents and then having to reload it onto another spreader.

It is to be understood that the fertilizer which comes from a feed lot is usually and mainly of heavy solid chunks and in the form of quite large chunks. It is therefore necessary in the spreading of such fertilizer onto a field to break up those large solid chunks, so that when the field is later plowed, the pieces can be thereby turned under and into the soil.

I have therefore provided a novel attachment to be attached at the tailgate end of such a large end-dump truck, and which is designed to break up such large fertilizer chunks by utilizing the force of the load of fertilizer in the dump box, when the box is raised on its pivot as though it were going to be emptied but for my attachment, as a part of the force used to effect a breaking of those large chunks, as a part of the overall spreading operation.

My novel attachment is in the form of a vertically operable endless spaced slatlike belt operable inwardly of the dump box and in the place of the tailgate of that dump box, to assist in effectively breaking up of those chunks as the horizontal slats are moved upwardly against the load in the tilted dump box. I space the slats of my endless belt elevator sufficiently apart to permit the broken up fertilizer to pass between the slats, and such fertilizer passing through the slatted belt falls upon a pair of conventional rotor spreader wheels which evenly throw and spread the fertilizer in a swath as the truck operates forwardly across the field, with its dump box in raised position.

It is a principal object of my invention in combination with a fertilizer spreader having an end-dump box, therefore, to provide an endless slatted beltlike operable breakup elevator in lieu of a tailgate for the end-dump truck box for the purpose of utilizing the force of the load of the fertilizer in the dump truck, on a raising of that dump truck box on its pivot, to cause the chunk-pieces of the fertilizer in the dump box to be broken up into small pieces as and by the slats of my breakup belt moving upwardly against the weight of that load in the box.

A further object of my invention is to provide a novel slatted endless beltlike breakup elevator for such a spreader dump box and operable in lieu of the tailgate of a dump body, having the side of the belt inwardly of the dump body operable vertically and with the slats of the belt spaced apart sufficiently to permit fertilizer particles to fall between said belt slats and downwardly onto a spreader positioned below said belt.

Other objects will be apparent from the following detailed explanation of a preferred embodiment of my invention and from the drawings thereof, in which:

FIG. 4 is a vertical sectional view on the line 4—4 of FIG. 3 looking in the direction of the arrow.

FIG. 5 is a partial side view of the rear of a dump truck having my invention thereon and with the dump box lowered.

FIG. 6 is a partial vertical elevational view of one side of my endless slatted belt conveyor attachment, taken on the line 6—6 of FIG. 2 and looking in the direction of the arrows.

Figure 2:
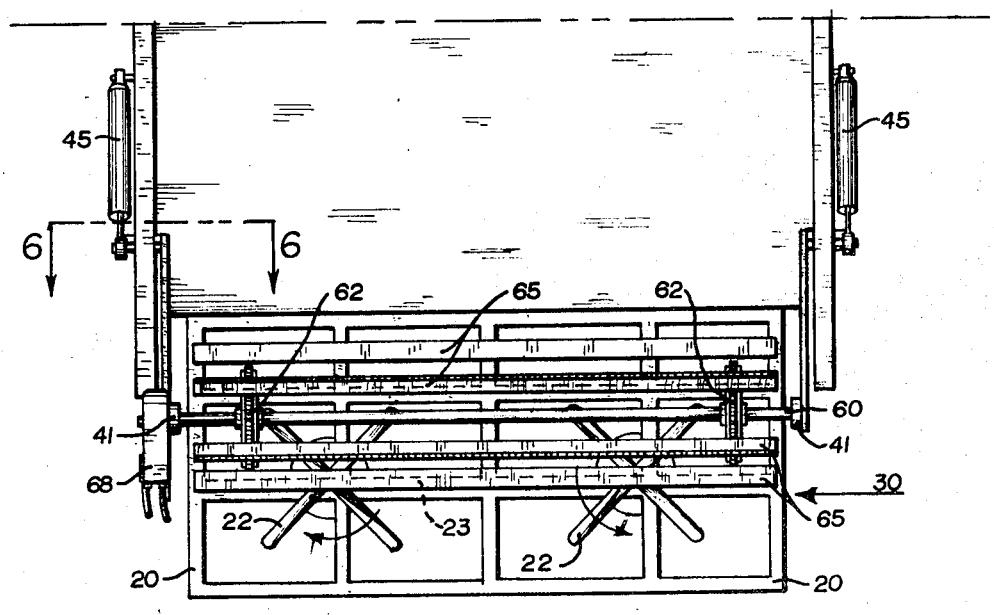
FIG. 2 is a top partial rear plan view of the rear portion of a dump truck having my attachment thereon, looking in the direction of arrow 2 of FIG. 5, with the dump box in lowered position.

It will be understood that this embodiment of my invention is applied to a large and heavy duty dump truck 10 having a frame 11, a conventional pivoted box type body, and which box 12 is pivoted at the pivot point 13 at the rear thereof to the frame 11. The box 12 is of the type having vertical solid walls 14 on 3 sides, and conventionally having a tailgate at the rear opening thereof, not illustrated. I provide aligned crescent slot openings 15 as illustrated, in the sidewalls of that dump box for purpose to be explained. A rigid mesh or open horizontal frame 20, is secured in extension of the truck frame 11 by upstanding solid arms 21 welded securely to the channel framework 11 of the truck, so that the portion 20 acts as a lower rigid horizontal extension of that truck frame portion. I mount a pair of twin identical horizontally rotatable distributor rotors 22, as illustrated on that horizontal platform frame 20. The rotors 22 are each operated by a suitable conventional hydraulic motor 24, and each in a direction, as indicated by the arrows, to throw fertilizer falling thereon outwardly therefrom. The left-hand rotor, as illustrated in FIG. 2, rotates clockwise and the right one thereof rotates counterclockwise. Each rotor motor 24 is suitably connected by hydraulic connections 24a with a suitable source of hydraulic power on the truck.

Figure 1:
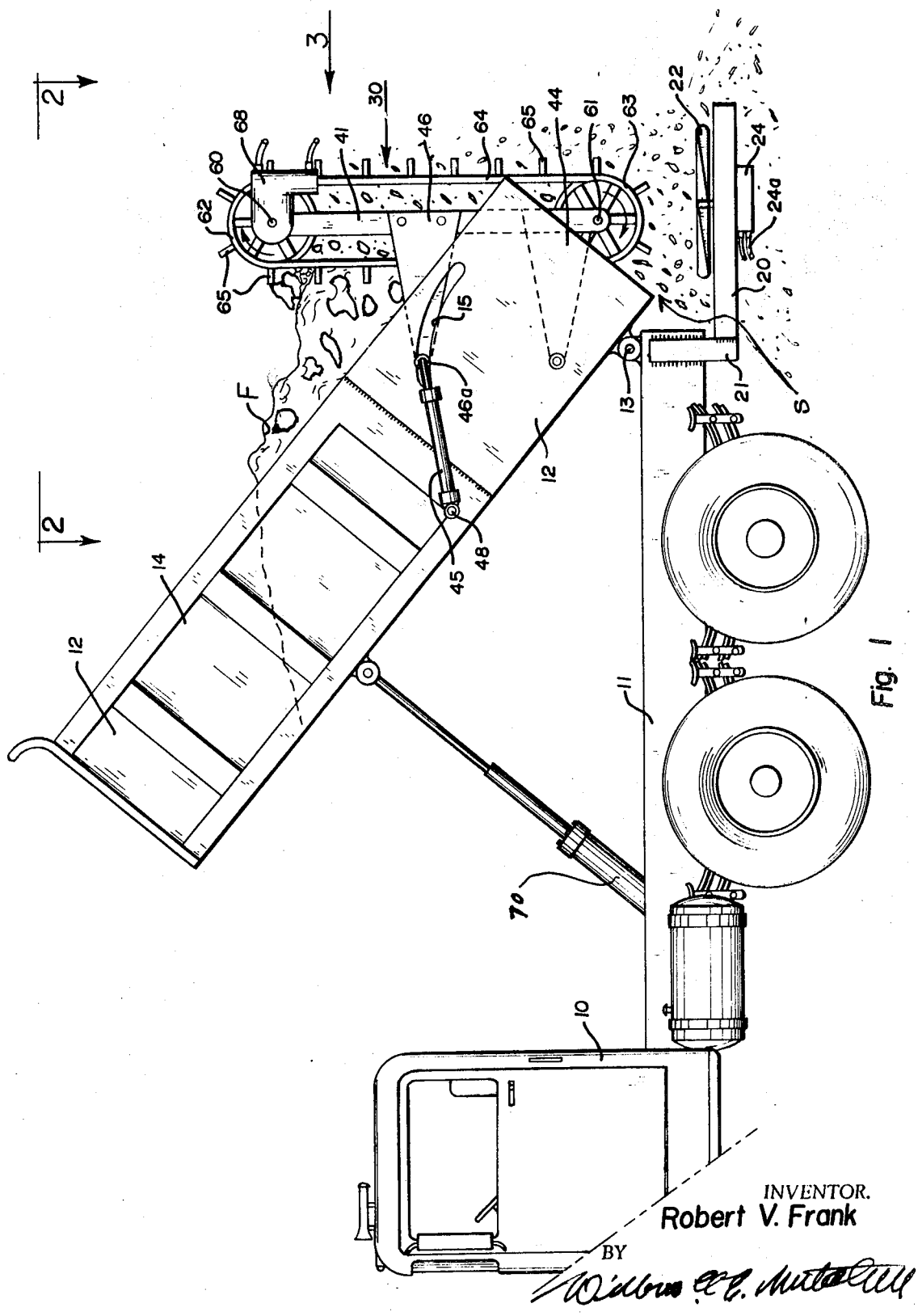
FIG. 1 is a side elevational view of a heavy rear end dump truck, with my attachments secured thereon, in dump operative position for spreading the fertilizer upon a pivot raising of that dump truck box.

I pivotally mount my novel slatted endless-belt breaker elevator, indicated generally as 30, to the rear open end of the dump box of the truck, at aligned suitable journal pivots 40, through corresponding upright sidewalls of that dump box, as illustrated. The breaker-elevator endless belt unit I mount on a suitable substantially rectangular vertical framework. That frame comprises upright members 41 having horizontal rigid spacer arms 42 secured thereto and therebetween, and angular support braces 43 as illustrated, near the upper portion to give lateral support to uprights 41 and the upper spacer crossarms 42. On the outer lower portion of each upright 41, I rigidly secure an identical and aligned triangular right angular rigid carrying arms 44, with the apex of each triangular arm having an opening therein to receive a pivot pin 40 extending through a pivot journal provided at aligned points at the lower rear of the vertical walls of the dump box, as illustrated. My endless breaker-elevator unit 30 is substantially of a width to fit within the rear opening of the dump box, in lieu of the conventional tailgate, and by the structure just described is adapted to be pivoted on the aligned pivot point, 40, to permit an arc pivot swinging movement thereof on aligned pivots 40, forwardly or rearwardly in relation to that dump box. As seen in FIG. 1 that arc pivotal positioning of 30 on the pivots 40 is controlled by a pair of identical hydraulic ram jacks 45, now to be explained. Identical triangular pivot arms 44 will be noted as being pivoted at their outer ends at points 40 within the sidewalls of the dump box 12. I provided another similar pair of aligned and equal length triangular rigid radial arms 46 securing the broad base of each rigidly to the uprights 41, about centrally to the uprights, as illustrated, and with the apex of each extending likewise adjacent within the dump box upright walls and with the apex of each of the arms 46 having a pivot opening therein. A right angular pivot bolt, 46a, is secured within that opening of each of the apex of arms 46 and with a bolt 46a being of a length to extend slidably through one of aligned arc openings 15 in each sidewall of the dump box. Each arm 46 is positioned on its uprights 41 so that its pivot bolt 46a can ride within that arc 15 opening, upon a pivoting of the belt unit 30 on its aligned pivots 40. Each arc opening 15 is on a radius with the aligned pivot points 40. On the outer end of each pivot bolt 46a I suitably pivotally secure the outermost end of a piston arm of like pair of conventional hydraulic ram jacks 45, as illustrated. The other end of each ram jack is conventionally pivoted as at 48 exteriorly of and to the dump box sidewall. The radial arms 44 and 46, pivot points 40, crescent bayonet slots 15 and pivot bolts 46a, through the slots connected to the ram jacks 45, and those jacks each pivoted at a point 48, exteriorally of the dump box, are all of identical size, proportion, construction and alignment and placement on each side of the dump box. Therefore, there can be a pivoting of the belt unit 30 on aligned and corresponding pivot points 40 thereof by the pair of ram jacks 45. It will be understood that I conventionally connect the ram jacks by suitable conduits to a source of hydraulic power on the truck, though not illustrated, so that each ram jack on each side of the truck box will operate simultaneously to expand or contract in conventional manner, for thereby effecting a pivotal adjustment, holding and positioning of the entire belt unit 30 on its aligned pivots 40.

Figure 3:
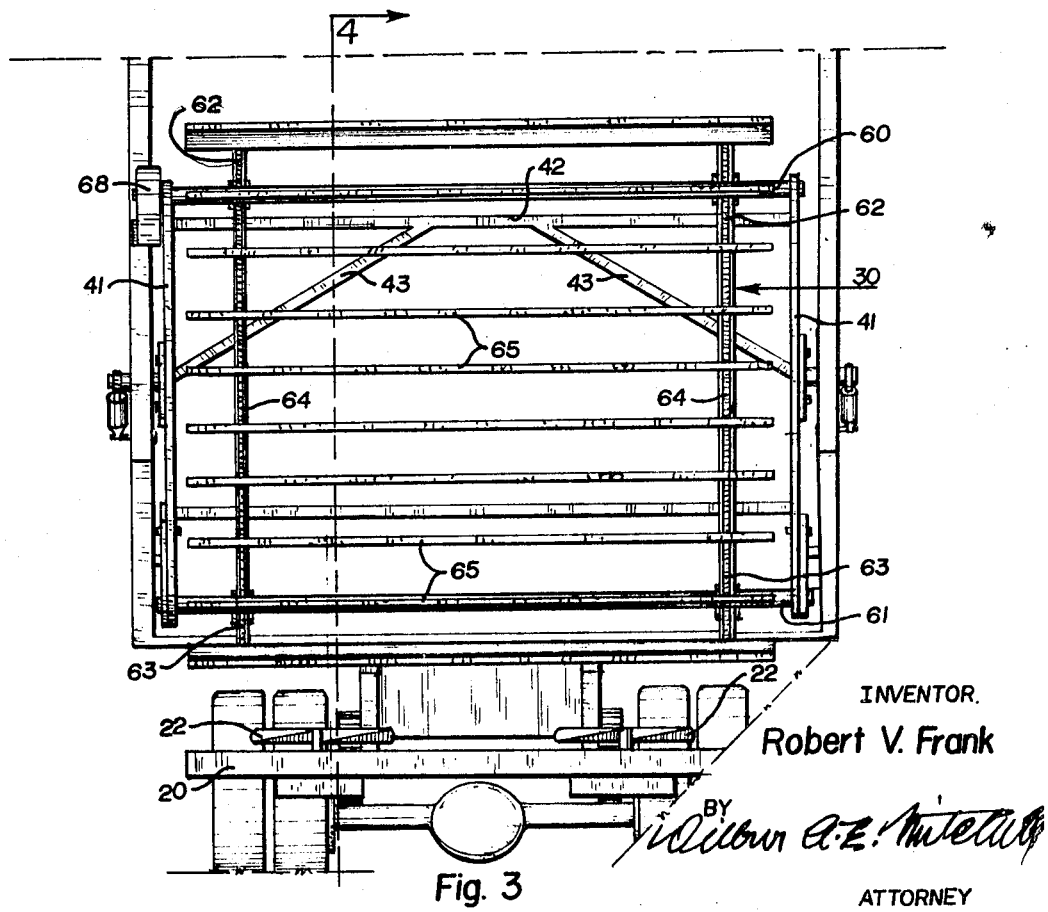
FIG. 3 is a rear end view looking in the direction of arrow 3 of FIG. 1.

I suitably journal an upper drive shaft 60, in the framework 30, for rotation at horizontally aligned uppermost points through the upper right frame members 41, and also suitably journal a driven lower rotatable shaft 61 through horizontally aligned openings through lower portions of the uprights 41. Upper shaft 60 extends outwardly of left upright 41, as shown in FIG. 3, and on that shaft 60 extension I suitably mount a conventional worm gear hydraulic drive motor 68 unit to that shaft 60 for effecting a drive rotation of that shaft by a suitable source of hydraulic power from the truck, all in conventional manner, though not illustrated.

It is the speed of this hydraulic motor 68 which determines how fast the fertilizer in the dump box is unloaded, and said speed can be varied, in conventional manner, and as will be explained.

I suitably key an identical upper pair of drive chain sprocket wheels 62 onto the drive shaft 60, as illustrated, and similarly key-mount a pair of driven sprocket wheels 63 onto the driven shaft 61. I mount an endless chain link belt 64 on each aligned ones of the pairs of sprocket wheels 62 and 63. I use a relatively strong chain endless link belt of 24,000 pounds breaking strength for obvious reasons. Strong angle iron slat arm members 65 are secured in spaced horizontal relationship onto the outer periphery of each of the endless chain belts 64, as illustrated, spaced approximately 10 inches between slats. Each slat 65 is strongly fixedly secured as by bolting or welding to a link of each endless chain.

In the operation of my novel vertically operable endless breaker sifter belt unit 30, it will be seen from the dotted line as illustrated in FIGS. 1 and 4, that it may be held in any pivotal position on aligned pivot points 40, by the ram jacks 45. Thus, my attachment 30 substantially closes the rear open portion of the dump box 12, in lieu of the conventional tailgates when that box in turn is raised by its ram jack 70 on its pivot 13, as by the unit 30 being held in the position as illustrated by the dotted line of FIG. 4 and during the clockwise rotational operation of my endless belt 64 of my unit. In that dotted line position it will be seen that fertilizer within the truck box 12 will be resisted to some extent from falling through the slotted breaker conveyor 64 by operation of that belt clockwise, as illustrated in FIGS. 1 and 4. That is especially so if the fertilizer is in large chunks within the box 12. During the operation of my novel slatted unit attachment, if the fertilizer is comparatively in small pieces, then the unit is operated with the dump truck raised and with the endless breaker conveyor unit 30 in position, as illustrated in FIG. 1, so that some of the fertilizer may escape, through the space indicated as S between the lower portion of the endless breaker conveyor 64 and the floor of the dump truck, onto the rotors 22.

In any pivotal position of my breaker conveyor 30, on its pivots—40—40, during dump-raised elevated or dump condition of the dump box 12 of the truck, the fertilizer contents of that dump box will slide downwardly, as illustrated by the line F of FIG. 1, as a result of the dump box being raised on its pivots 13, and at the same time, as a result of my endless belt 64 rotating clockwise, as there illustrated. Any large chunks of fertilizer in the mass F will be eventually gravity-pressed against the adjacent upwardly raising slats 65, by their weight and by the weight of that fertilizer mass within that box, and those chunks will not be raised by that elevator and slats 65 but will be gradually broken up or worn into smaller pieces by those slats rubbing thereagainst and thereby the chunks will be, in effect, pulverized. Then those small pieces will fall between the slats 65, since the breaker belt 30 moves relatively slowly, and then down onto the rotor spreader wheels 22.

It is to be observed that this invention is for the purpose of breaking up large chunks of feed lot fertilizer as hauled by a large dump truck from such a feed lot and is for the purpose of adapting that truck to also be a spreader truck, to spread the fertilizer onto the field without having to transfer the contents from that big truck onto a smaller conventional spreader truck.

I have designed my raisable endless breaker belt 30, attached in lieu of the tailgate of such a dump truck, with spaced-apart slats, and so that as the contents of the dump truck is thereby substantially broken up within the dump truck that then the small broken pieces escape through the spaces between its slats 65 and onto the horizontal rotor distributor wheels 22. My attachment does not raise the enormous pieces of dried hard fertilizer up out of the box by the slatted conveyor, but my slatted endless breaker conveyor is only for the purpose of utilizing the cooperative gravity force of the load, when the dump truck is raised on its pivots 13, for causing the large chunks to be pressed against my horizontally raising slats by that gravity force as the endless conveyor belt inner truck side raises and to thereby break up those chunks. Thus I permit the contents of the truck bed to become exhausted by escaping through my endless slatted belt breaker unit 30 and onto the rotor distributor wheels 22, and not up and over the top of the unit 30.

It will be further seen that by the pivotal construction by my elevator 30 construction, and its adjustability toward and away from the dump box end, at the otherwise tailgate portion thereof, that the weight of the fertilizer against the slats on the operation of my endless conveyor helps in the breaking up of the chunks of the fertilizer, and that adjustability will either increase or decrease the breaking pressure caused by those slats on the operation of the conveyor, dependent upon whether the adjustment of 30 is toward the dump box or away from it, respectively.

I have designed my improvement so that the parts thereof may be easily attached to any conventional large tandem wheel rear-end-dump-box truck, upon the removing of the tailgate thereof, by any average mechanic.

Many changes and modifications may be made in my invention without deviating from the teaching, spirit and scope thereof.

What I claim and desire by Letters Patent is:

1. As a fertilizer spreader machine, a dump truck comprising:
   a. a pivoted dump body adapted to be raised on a pivot at its lower rear portion and having a removed tailgate and portion; and
   b. an endless rotatable belt chunk breaker attachment adapted to be operated substantially in lieu of the tailgate portion at said removed tailgate end portion and rotatably operable to have its side inwardly of the tailgate end portion rotatably raisable; and
   c. a horizontal rotor distributor secured to the rear of the truck and positioned substantially under said endless breaker belt.

2. A spreader machine as described in claim 1, and characterized further by the definition of said endless lump breaker belt having horizontally spaced-apart slats secured thereto.

3. A fertilizer spreader attachment adapted to be mounted to the rear of a truck rear-dump box, having a tailgate portion but with the tailgate eliminated, comprising:
 a. an endless rotatable beater-belt elevator built within and as the tailgate portion of the dump box and being substantially vertically operable; and
 b. said endless rotatable beater belt having horizontally spaced-apart cross-slats and being rotatable with its elevating side positioned adjacent the tailgate space at said tailgate portion of the box; and
 c. a horizontally rotatable rotor distributor under said tailgate portion and said elevator beater belt.

4. A fertilizer spreader attachment as defined in claim 3, and characterized further by the definition of said vertically operable beater elevator being pivoted at a rear portion of the dump box and being adjustable on its pivot for varying the angle between the beater elevator and the bed of the truck box, for thereby in turn varying the resistance of the fertilizer against the horizontal slats thereof upon the dump box pivotal raised position to cause a gravity movement of the fertilizer within the box toward that beater conveyor.

5. A chunk fertilizer spreader machine comprising:
 a. a vehicle having a pivoted chunk-fertilizer-carrier dump body adapted to be raised on its pivot and having a removable gate portion adjacent its pivot;
 b. a vertically moveable chunk-breaker attachment having spaced-apart breaker members and being adapted to permit broken particles of fertilizer to pass therethrough and positioned on the body in lieu of said gate portion and being operably moveable to break up fertilizer chunks coming into contact therewith;
 c. whereby upon the dump body being pivotally raised the chunk fertilizer therein will be gravity moved against the moveable breaker attachment for effecting a breaking of the chunks by the moveable breaker attachment and for permitting a passage of the resultant broken fertilizer through the breaker attachment.

6. In combination, a chunk fertilizer spreader machine comprising:
 a. a wheeled vehicle having a frame;
 b. a pivoted fertilizer carrying dump box pivotally mounted on the frame and the box having an open dump portion adjacent its pivot;
 c. a vertically moveable chunk-breaker attachment having spaced-apart breaker members and being positioned on the vehicle adjacent said open portion of the dump box so that on such pivotal box raising that chunk fertilizer dumping through the open portion of the box will be gravity moved in a direction against the moveable breaker attachment; and
 d. whereby, on a pivotal dump raising of the box, a gravity movement of the chunk fertilizer therein will thereby be effected against the moveable breaker and whereby the moveable breaker then will substantially break up said fertilizer chunks leaving said box opening on such fertilizer movement against the breaker.

UNITED STATES PATENT OFFICE
CERTIFICATE OF CORRECTION

Patent No. 3,602,404  Dated August 31, 1971

Inventor(s) Robert V. Frank

It is certified that error appears in the above-identified patent and that said Letters Patent are hereby corrected as shown below:

Column 4, line 66, "tailgate and por-" should read -- tailgate end por- --.

Signed and sealed this 25th day of July 1972.

(SEAL)
Attest:

EDWARD M. FLETCHER, JR.
Attesting Officer

ROBERT GOTTSCHALK
Commissioner of Patents